US010298558B2

(12) United States Patent
Barkie et al.

(10) Patent No.: US 10,298,558 B2
(45) Date of Patent: *May 21, 2019

(54) USER AUTHENTICATION RELYING ON RECURRING PUBLIC EVENTS FOR SHARED SECRETS

(71) Applicant: International Business Machines Corporation, Armonk, NY (US)

(72) Inventors: Eric J. Barkie, Cary, NC (US); Benjamin L. Fletcher, Denver, CO (US); Andrew P. Wyskida, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/343,294

(22) Filed: Nov. 4, 2016

(65) Prior Publication Data

US 2017/0054704 A1 Feb. 23, 2017

Related U.S. Application Data

(63) Continuation of application No. 14/597,626, filed on Jan. 15, 2015, now Pat. No. 9,628,456.

(51) Int. Cl.
*H04L 29/06* (2006.01)

(52) U.S. Cl.
CPC .......... *H04L 63/067* (2013.01); *H04L 63/065* (2013.01); *H04L 63/083* (2013.01); *H04L 63/10* (2013.01)

(58) Field of Classification Search
CPC .................................................... H04L 63/083
See application file for complete search history.

(56) References Cited

U.S. PATENT DOCUMENTS

| 5,109,403 | A | 4/1992 | Sutphin |
| 6,944,651 | B2 | 9/2005 | Onyon et al. |
| 7,093,130 | B1 | 8/2006 | Kobayashi et al. |
| 7,099,952 | B2 | 8/2006 | Wong et al. |
| 8,090,945 | B2 | 1/2012 | Singhal |
| 8,504,831 | B2 | 8/2013 | Pratt et al. |

(Continued)

OTHER PUBLICATIONS

Wullems, C., "Engineering Trusted Location Services and Context-aware Augmentations for Network Authorization Models," Information Security Research Centre, Faculty of Information Technology, Queensland University of Technology, Mar. 2004, 307 pages.

(Continued)

*Primary Examiner* — William S Powers
(74) *Attorney, Agent, or Firm* — Jamar K. Ray (57) ABSTRACT

An access manager manages access to a resource. At a first time, the access manager designates a variable attribute associated with a recurring public event as a shared secret between the access manager and a user. At a second time occurring after the first time, the access manager receives a shared key from the user. As received, the shared key is based on a value of the variable attribute associated with the recurring public event at a most recent recurrence of the recurring public event relative to the second time. The access manager evaluates the shared key. In response to the evaluation, the access manager grants or denies the user access to the resource.

13 Claims, 6 Drawing Sheets

(56) References Cited

U.S. PATENT DOCUMENTS

| | | |
|---|---|---|
| 8,732,459 B2 | 5/2014 | Leedom, Jr. |
| 9,225,717 B1 | 12/2015 | Brainard et al. |
| 2004/0102242 A1* | 5/2004 | Poelmann ............... G06F 7/582 463/22 |
| 2005/0114678 A1* | 5/2005 | Bagga .................... G06F 21/46 713/183 |
| 2006/0080729 A1* | 4/2006 | Koh ....................... G06F 21/46 726/5 |
| 2007/0186106 A1 | 8/2007 | Ting et al. |
| 2010/0031051 A1 | 2/2010 | Machani et al. |
| 2010/0241850 A1 | 9/2010 | Xiong |
| 2011/0197266 A1 | 8/2011 | Chu et al. |
| 2011/0213790 A1 | 9/2011 | Fullton et al. |
| 2012/0102322 A1* | 4/2012 | O'Brien ............... H04L 9/3271 713/168 |
| 2013/0263216 A1 | 10/2013 | Vakil et al. |
| 2014/0095226 A1 | 4/2014 | Kourkoumelis et al. |
| 2014/0331286 A1 | 11/2014 | Davis et al. |
| 2015/0014412 A1* | 1/2015 | Sulavik ................. G06Q 10/02 235/380 |
| 2015/0117646 A1* | 4/2015 | Best ..................... H04W 12/08 380/270 |
| 2016/0212110 A1 | 7/2016 | Barkie et al. |

OTHER PUBLICATIONS

IBM, List of IBM Patents or Patent Applications Treated as Related, Oct. 17, 2016, 2 pages.

* cited by examiner

USER AUTHENTICATION RELYING ON RECURRING PUBLIC EVENTS FOR SHARED SECRETS

BACKGROUND

The present disclosure relates to digital user authentication and, more specifically, to user authentication relying on a variable attribute associated with a recurring public event as a shared secret.

In order to gain access to resources (e.g., email, proprietary databases, and certain physical objects) it may be necessary for a user requesting access to provide certain credentials to an access manager responsible for managing access to the resources. These credentials may serve to authenticate the user. The credentials may include a shared key (e.g., a password). As used herein, a shared key may include a string of characters used to authenticate a user and/or allow a user to gain access to a resource. For a shared key to have and maintain value, it may need to be based on a shared secret. As used herein, a shared secret may refer to a secret piece of data, the identity of which is known only to parties authorized to access the resource that the shared secret serves to protect. In some situations, the shared secret of a password may be the entire password itself.

SUMMARY

According to embodiments of the present disclosure, aspects of the disclosure may include a method, a system, and a computer program product for managing access to a resource by an access manager. At a first time, the access manager designates a variable attribute associated with a recurring public event as a shared secret between the access manager and a user. At a second time occurring after the first time, the access manager receives a shared key from the user. As received, the shared key is based on a value of the variable attribute associated with the recurring public event at a most recent recurrence of the recurring public event relative to the second time. The access manager evaluates the shared key. In response to the evaluation, the access manager grants the user access to the resource.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to digital user authentication and, more specifically, to user authentication relying on a variable attribute associated with a recurring public event as a shared secret. While the present disclosure is not necessarily limited to such applications, various aspects of the disclosure may be appreciated through a discussion of various examples using this context.

In some situations, user authentication may be based on a single invariant password. This may pose certain problems. For example, an interloper who obtains the password while it is being transmitted may be able to use the password on one or more occasions to gain fraudulent access to a resource intended to be used only by an authorized user. Furthermore, if the invariant password is used more than one time, it may increase the chances that the password can be intercepted by an interloper.

In other situations, a security token may be used in order to increase the security of shared keys. Such a token may be configured to generate one-time passwords, for example, using methods based on time-synchronization or complex algorithms. These tokens, however, may have their own disadvantages. For example, a physical security token may be lost by or stolen from an authorized user. Furthermore, security token generated passwords may be too long or too complex to be remembered by a human and, because such passwords are generated based on algorithms, they cannot be considered random.

In some embodiments, a variable attribute associated with a recurring public event may be designated as a shared secret between an access manager and a user. Then, at a later time when the user wants to access a resource managed by the access manager, the user may transmit to the access manager a shared key that is generated based on that shared secret. More specifically, the shared key may, if it is correct, be based on a value of the shared secret at a most recent recurrence of the recurring public event relative to when access is requested. In some embodiments, passwords generated in this manner may be limited-use (e.g., single-use) passwords and the method for generating the passwords from the shared secret may be capable of being remembered by a human.

As used herein, a recurring public event may refer to any occurrence which repeats over time and which has information about each occurrence known by or disseminated to members of the public generally. Types of recurring public events may include, without limitation, weather occurrences, newsworthy events, blog posts, sports games, social media feeds, and stock prices. In some embodiments, a recurring public event may be a real-time event or an Internet-based event. Specific examples of recurring public events may include, without limitation, blog posts on a particular blog, weather at a particular location, and games of a particular sports team. Furthermore, as used herein, a variable attribute may refer to an aspect of a recurring public event that tends to change with each recurrence of the event. Examples of variable attributes may include, without limitation, the second word of a particular blog post on a particular blog, the particular temperature at a particular location, and a particular score of a particular sports team's game.

Figure 1:
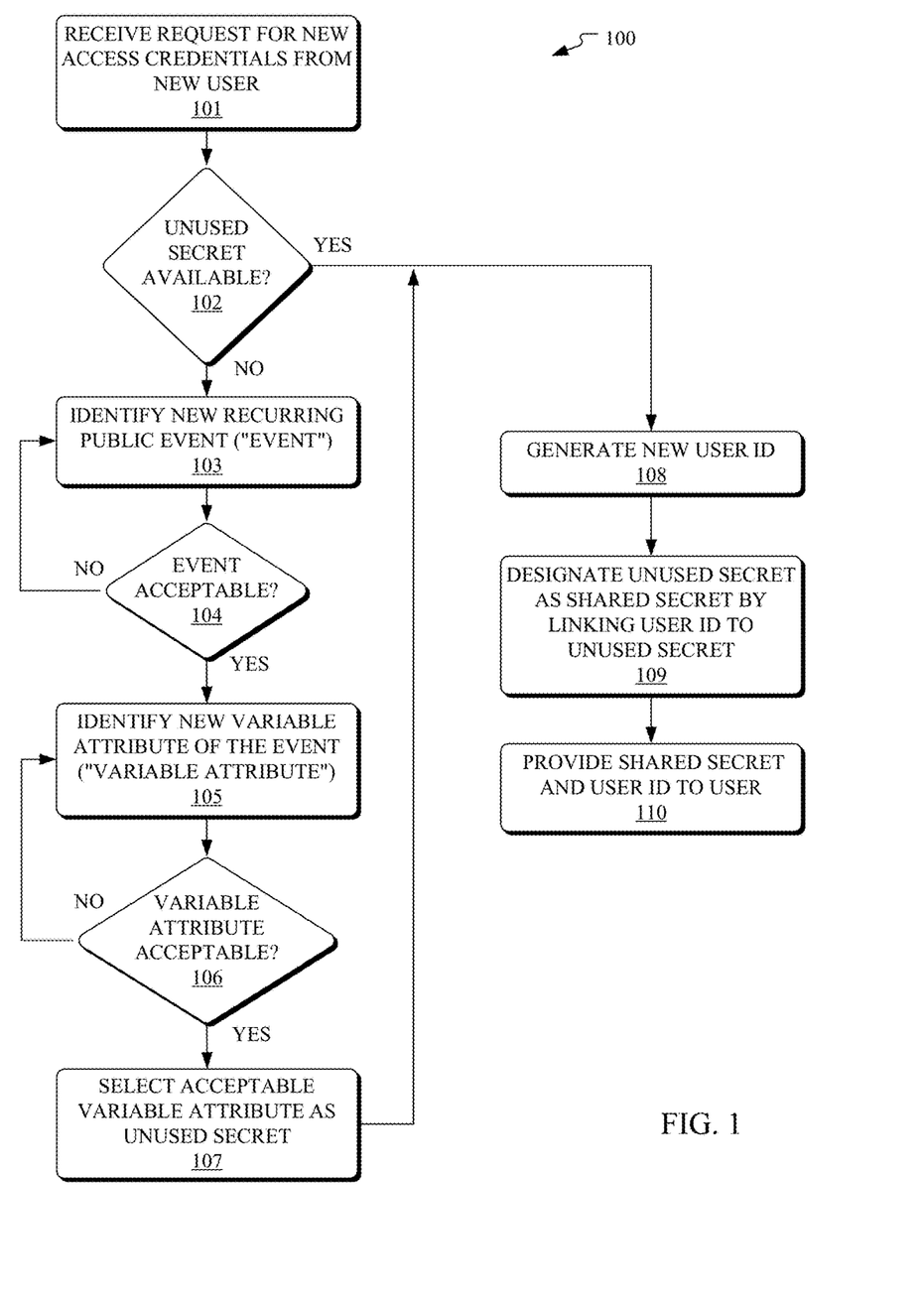
FIG. 1 illustrates a flowchart of an example method for providing a user identifier (user ID) and shared secret to a user, in accordance with embodiments of the present disclosure.

Referring now to FIG. 1, shown is an example method 100 for providing a user identifier (user ID) and shared secret to a user, in accordance with embodiments of the present disclosure. In some embodiments, the method 100 may be performed by an access manager using (or operating on) a computer, such as the computer described herein in reference to FIG. 6. The method may begin at operation 101 wherein the access manager receives a request from a new user for new access credentials (e.g., a new password and a new user ID (username)) that may allow the user to access, at the user's discretion, a resource controlled by the access manager. Per operation 102, the access manager determines whether there is an unused secret (e.g., a secret having an identity known only to the authentication manager and not yet shared with any other user) available for sharing with this user.

If, per operation 102, the access manager determines that there is no available unused secret, the access manager may attempt to obtain a new unused secret that can be shared with the user. Per operation 103, the access manager identifies a new recurring public event that could act as a basis for a secret. Once identified, the new recurring public event is evaluated, per operation 104, to determine whether the new recurring public event is likely to serve as an acceptable basis for a shared secret. Many factors may be considered during this evaluation. For example, factors may include how often the event repeats (e.g., with an event that recurs infrequently being rated negatively); how regularly the event repeats; how widely known the event is (e.g., with an event that is not widely disseminated being rated negatively); and how reliably the event may be expected to continue to repeat into the future. For another example, in some embodiments, a new recurring public event may only be deemed acceptable if the values of variable attributes associated with each recurrence of the event are unknowable before that particular recurrence. Further, in some embodiments, the new recurring public event may be given an event score (based on one or more factors) and it may only be deemed acceptable if the event score achieves an event score threshold. If, per operation 104, the access manager determines that the new recurring public event is not acceptable, then operations 103 and 104 may be repeated in order to identify and evaluate another recurring public event.

If, however, per operation 104, the access manager determines that the new recurring public event is acceptable, then, per operation 105, a new variable attribute of the recurring public event may be identified. The newly identified variable attribute may then be evaluated, per operation 106, to determine whether it is can serve as an acceptable shared secret. Like the evaluation of the recurring public event itself, the evaluation of the variable attribute may involve consideration of a number of factors. These factors may include, for example, the time since a value of the variable attribute was a repeat of a prior value (e.g., with a shorter time since the last repeated value tending to show non-randomness, and, therefore, being rated negatively). Furthermore, the variable attribute may be given a factor-based attribute score and may ultimately be used only if its attribute score achieves an attribute score threshold. If, per operation 106, the access manager determines that the new variable attribute is not acceptable, then operations 105 and 106 may be repeated in order to identify and evaluate another variable attribute of the recurring public event. If, however, per operation 106, the access manager determines the variable attribute is acceptable, then, per operation 107, the new variable attribute of the recurring public event may be selected as an unused secret.

Once an unused secret is identified (e.g., either directly in operation 102 or after operation 107 is completed) a new user ID may be generated, per operation 108, for the user requesting the new access credentials. Per operation 109, the unused secret is designated as a shared secret between the access manager and the user. This may include linking the user ID to the unused secret in a database used by the access manager. Once the unused secret has been designated as a shared secret between the access manager and the user, in some embodiments, that particular secret may no longer be deemed an unused secret by the access manager. This may prevent the same secret from being designated as a shared secret between the access manager and more than one user. Per operation 110, the shared secret and the user ID are provided to the user. These credentials may be provided to the user out of band, for example, via a one-time use secure communication channel between the access manager and the user. In some embodiments, the user may also be provided with instructions on how to use the shared secret to generate an appropriate password. For example, the user may be informed that the shared key at any given time will be the sum of the characters comprising the value of the shared secret at that time. In some embodiments, these instructions may be widely known or may themselves be part of the shared secret between the access manager and the user.

While an example of method 100 is described in reference to FIG. 1, it is contemplated that many other variants of method 100 are possible. For example, in some embodiments, the access credentials provided to the user could include any number of credentials of any type. For example, a user could be provided with a shared secret that acts as the sole credential the user will need to access the resource. For another example, the user could be provided with several credentials which must be used together to gain access (e.g., a user ID, a shared secret, and a physical token in a setting requiring multi-factor authentication).

In another variant on method 100, in some embodiments, unused secrets may not be selected on an as-needed basis, but rather the access manager may identify and evaluate several unused secrets (e.g., using several iterations of operations 103-107) prior to the need for those unused secrets arising. These unused secrets may then be stored in a database until they are needed for new users.

In yet another variant on method 100, in some embodiments, a shared secret may be continuously or periodically evaluated even after it has been placed in use. This may involve the access manager polling or monitoring the variable attribute associated with the recurring public event that serves as the basis for the shared secret. The access manager may then evaluate the variable attribute associated with the recurring public event to determine if the variable attribute remains a viable shared secret. For example, the access manager may track the values of the variable attribute and determine whether these values achieve a minimum acceptable level of variability. This minimum level may be set by the access manager and may be determined based on how often the values repeat, how much the values vary over time, or other factors. If the level of variability of the values falls below the minimum, then the access manager may designate a new shared secret to the user in place of the original shared secret.

To aid understanding, an example scenario in which an embodiment of method 100 is utilized is described herein. In this scenario, a biologist purchases the right to access a gene database owned by a company. The biologist sends a request to the company's access manager (per operation 101) to get credentials to access the database. The access manager (per operation 102) determines that it does not have any more unused secrets available to designate as a new shared secret and attempts to obtain a new unused secret. As part of this attempt, the access manager (per operation 103) identifies the winter Olympics as a new recurring public event. However, upon evaluation of this event (per operation 104), the access manager determines that the winter Olympics does not recur often enough to serve as an acceptable public event. The access manager (per operation 103 again) then identifies weather in Spokane, Wash. as another recurring public event. This second event passes the company's event evaluation standards (per operation 104 again). The access manager then identifies current wind speed as a variable attribute of the weather in Spokane (per operation 105). The access manager determines, however, that (per operation 106) wind speed in Spokane is too variable to meet the company's criteria for an acceptable variable attribute. The access manager then (per operation 105 again) identifies current temperature in Spokane as a new variable attribute and evaluates this new variable attribute positively (per operation 106 again). The current temperature in Spokane is selected (per operation 107) as acceptable variable attribute. The access manager then generates a new user ID (per operation 108) of "BIO128" for the biologist. The current temperature in Spokane is designated as a shared secret between the biologist and the access manager (per operation 109) when the access manager links "BIO128" with "current temperature in Spokane" in its password storage area. The access manager (per operation 110) then provides the user ID and shared secret to the biologist so that he can access the gene database at any time in the future.

Ultimately, in some embodiments, a public-event based authentication system may include an access manager providing users of the system with information about which public events the users will need to monitor and, if required, the tools needed to convert this information about public events into acceptable shared keys (e.g., an algorithm that converts event information into the appropriate form).

Figure 2:
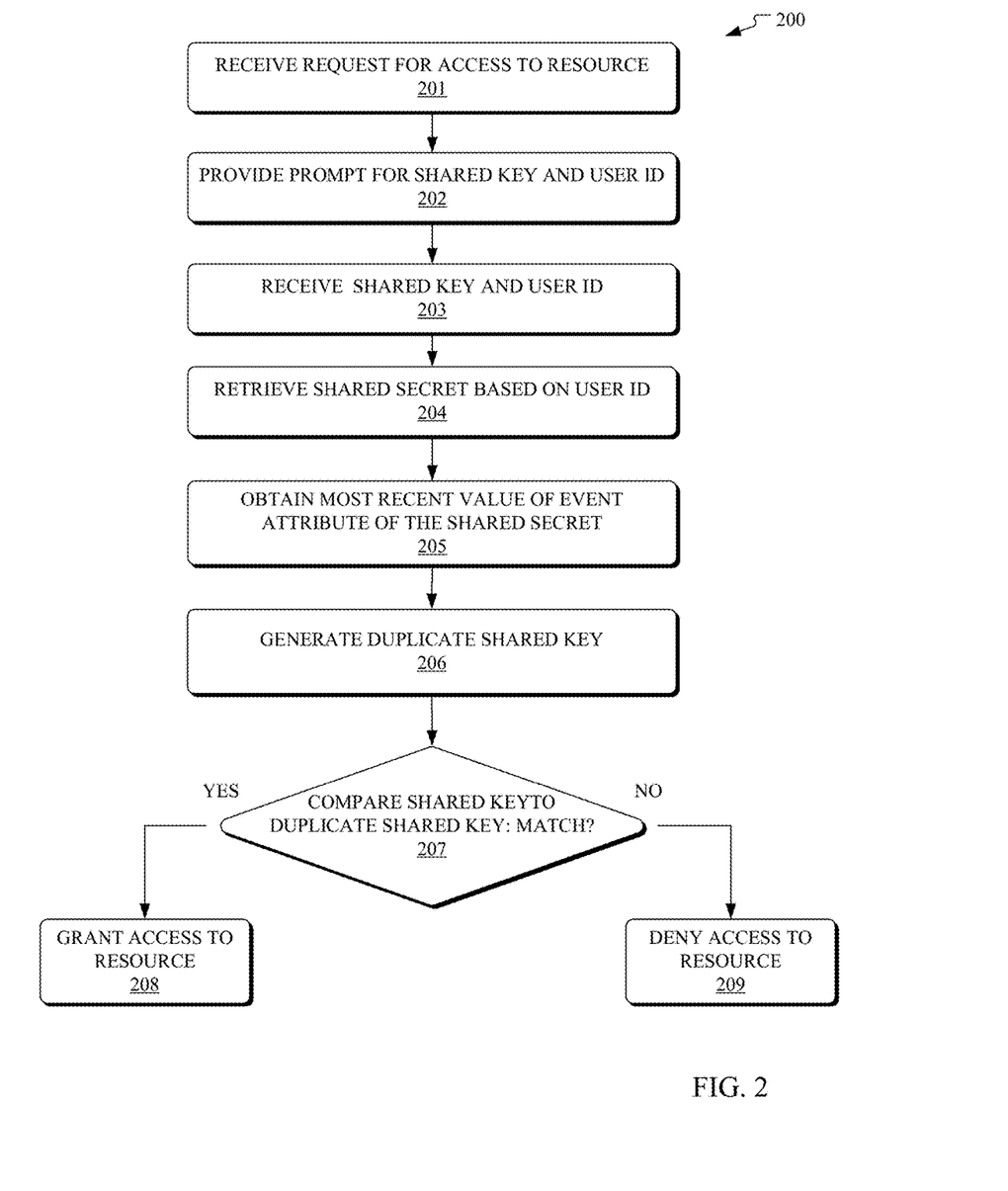
FIG. 2 illustrates a flowchart of an example method for responding to a resource access request, in accordance with embodiments of the present disclosure.

Referring now to FIG. 2, shown is an example method 200 for responding to a resource access request, in accordance with embodiments of the present disclosure. In some embodiments, the method 200 may be performed by an access manager. Further, in some embodiments, prior to performing method 200, the access manager may have provided shared secrets and user IDs to one or more users by performing one or more iterations of method 100 described in reference to FIG. 1. The method 200 may begin, per operation 201, with the access manager receiving a request for access to the resource. In response to receiving the access request, the access manager, per operation 202, provides the resource requester a prompt for a shared key and a user ID. Per operation 203, the access manager receives, in response to the prompt, a shared key and user ID.

Per operation 204, the access manager retrieves the shared secret associated with the received user ID. The access manager may then identify, for that particular shared secret, the particular recurring public event (more specifically, the particular variable attribute of that particular event) upon which the shared secret is based. Per operation 205, the access manager obtains the value of that variable attribute at the most recent recurrence of that recurring public event. This value may be obtained through any applicable steps. For example, in some embodiments, the value may be obtained from a proprietary event database accessible to the manager or through an API linking the access manager to a third party information source (such as a news agency). In some embodiments, a particular value of a variable attribute associated with a recurring public event at any particular recurrence of the public event may be unknowable by the access manager and the user prior to that particular recurrence. This may be achieved, in some embodiments, by selecting as a shared secret a recurring public event that is independent of the influence by either party.

Per operation 206, the access manager uses the obtained value to generate a duplicate shared key. As used herein, a duplicate shared key (e.g., a duplicate password) may refer to an exact copy of the correct shared key or some other equivalent shared key that is recognized by the access manager as the same as the correct shared key (e.g., the correct shared key, but in a different format or a derivation of the correct shared key). In some embodiments, the correct shared key (and duplicate shared key) on any particular occasion may not be the value of the variable attribute per se, rather the shared key may be based on that value in a different manner or in a different format. For example, in some embodiments, the value of variable attribute could be a word and the shared key could be a hash of that word. For another example, in some embodiments, the value of the variable attribute could be a basis for deriving a security key using one or more algorithms, and the security key could then be used as the shared key. For yet another example, in some embodiments, the value of the variable attribute could define a skip code for determining the correct shared key.

Per operation 207, the duplicate shared key is compared to the received shared key to determine if they match. If there is a match, the access manager may grant the requester access to the resource, per operation 208. If, however, there is not a match, then, per operation 209, the requester may be denied access to the resource.

Figure 3:
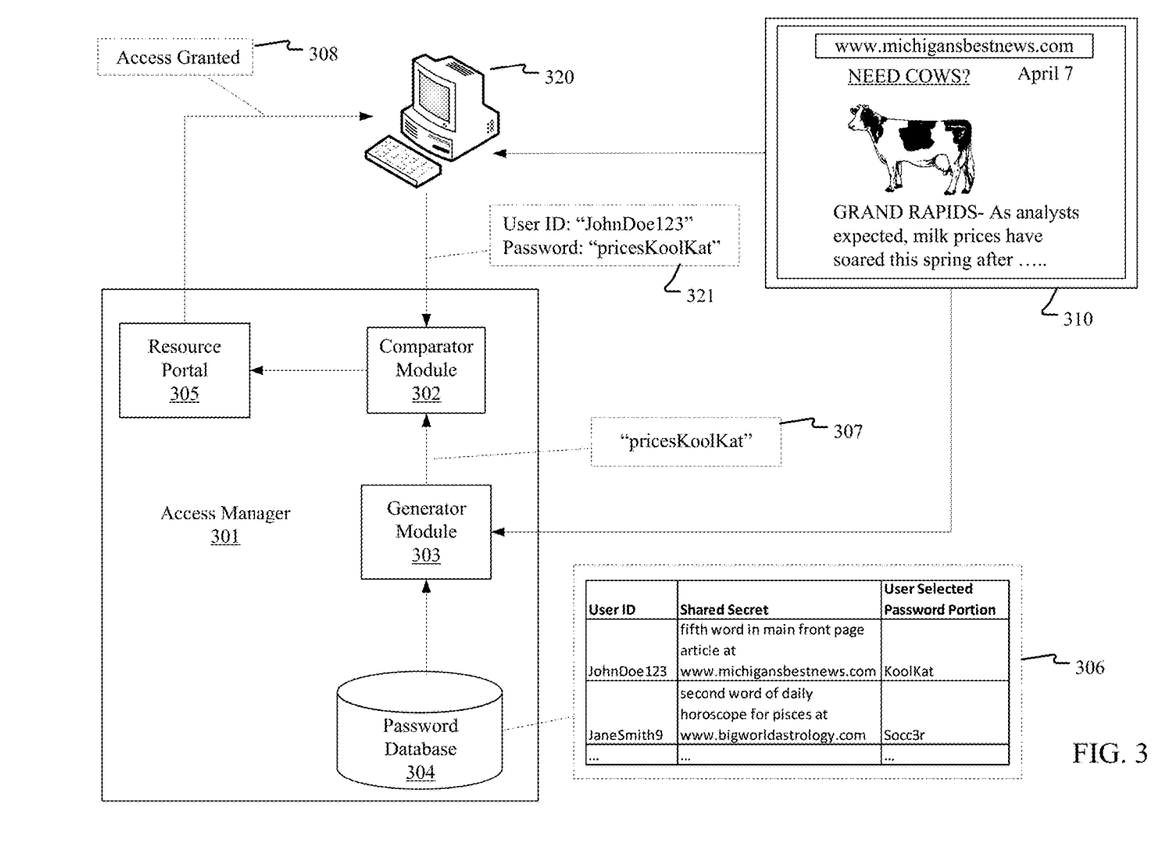
FIG. 3 illustrates a block diagram depicting an authorized user communicating with an access manager in an attempt to gain access to a resource, in accordance with embodiments of the present disclosure.

Referring now to FIG. 3, shown is a block diagram depicting an authorized user 320 communicating with an access manager 301 in an attempt to gain access to a resource, in accordance with embodiments of the present disclosure. As shown, the diagram includes a computer of an authorized resource user 320, an access manager 301, and a webpage 310. Within the access manager 301 is a password database 304, a generator module 303, a comparator module 302, and a resource portal 305. The password database 304 may be configured to store user IDs and shared secrets linked with the user IDs. The password database 304 may be encrypted. The generator module 303 may be configured to obtain relevant user information from the password database 304 and use that information to generate duplicate passwords in response to access requests. The comparator module 302 may be configured to compare passwords received from access requesters (such as authorized user 320) with duplicate passwords received from the generator module 303. The resource portal 305 may be configured to provide the results of the password comparison to the access requester and, if access is granted, to allow the access requester entry into the resource.

In the example depicted in FIG. 3, the access manager may have a policy dictating that passwords used in this system include two parts: a fixed first password portion that is selected by the user at the time the user's account is created and a variable second password portion that is based on a shared secret. Further, in this example system, each shared secret is a different variable attribute associated with a different recurring public event. An example of a data table 306 that may be stored in password database 304 is shown in the callout box. In this example, the user with the user ID "JohnDoe123" has a designated shared secret of "fifth word in main front page article at www.michigansbestnews.com" and a user selected password portion of "KoolKat". Another user with the user ID "JaneSmith9" has designated shared secret of "second word of daily horoscope for Pisces at www.bigworldastrology.com" and a user selected password portion of "Socc3r". The password database may further include listings for other users having other credentials. In some embodiments, the access manager's policy may further require that, in order for a specific recurring public event to serve as a shared secret, each recurrence of the public event may need to be publicly disseminated by at least one third party during that recurrence. This may help to ensure that any given recurrence of the public event will be easily detectable by the user and the access manager.

The authorized user 320 begins the process of accessing the resource by recalling his user selected password portion of "KoolKat", his shared secret, and the order in which the two are to be used in creating his password. He then uses his computer to access the webpage 310, which includes the current (i.e., April 7th) main front page article at www-.michigansbestnews.com (this being the most recent recurrence of the recurring public event of interest). By skimming the article, the authorized user 320 determines that the fifth word of the article is "prices" (this being the most recent value of the variable attribute of interest). The authorized user 320 then enters, per box 321, his user ID of "JohnDoe123" and his current complete password of "pricesKoolKat" and transmits these credentials to the access manager 301. In some embodiments, the search for and entry of the authorized user's credentials may be performed by a computer automatically, rather than by the user manually. Further in some embodiments, the shared secret information required to generate the password may not be known by authorized user 320, rather the information may be stored on a secure portion of his computer's hard drive, for example.

Upon receipt of the credentials, the generator module 303 obtains the shared secret and user selected password portion associated with user ID "JohnDoe123" from the password database 304. The generator module 303 then obtains the word "prices" from webpage 310. The generator module 303 then generates a duplicate password of "pricesKoolKat", per box 307. The duplicate password and received password are then compared by the comparator module 302. The comparator module 302 notifies the resource portal 305 that there is a match. Based on the match, the resource portal 305 grants the authorized user 320 access to the resource per box 308.

While, in some embodiments, the access manager 301 and authorized user 320 may be explicitly or implicitly required to use the same, pre-defined information source (e.g., webpage 310) in order to obtain the necessary value of a particular variable attribute, it is contemplated that, in other embodiments, the access manager 301 and the authorized user 320 may be able to use different sources to obtain the same necessary information. For example, the access manager may use a first website to obtain the correct value of a shared secret, while the authorized user uses a completely different second website to obtain the same correct value of the shared secret.

Figure 4:
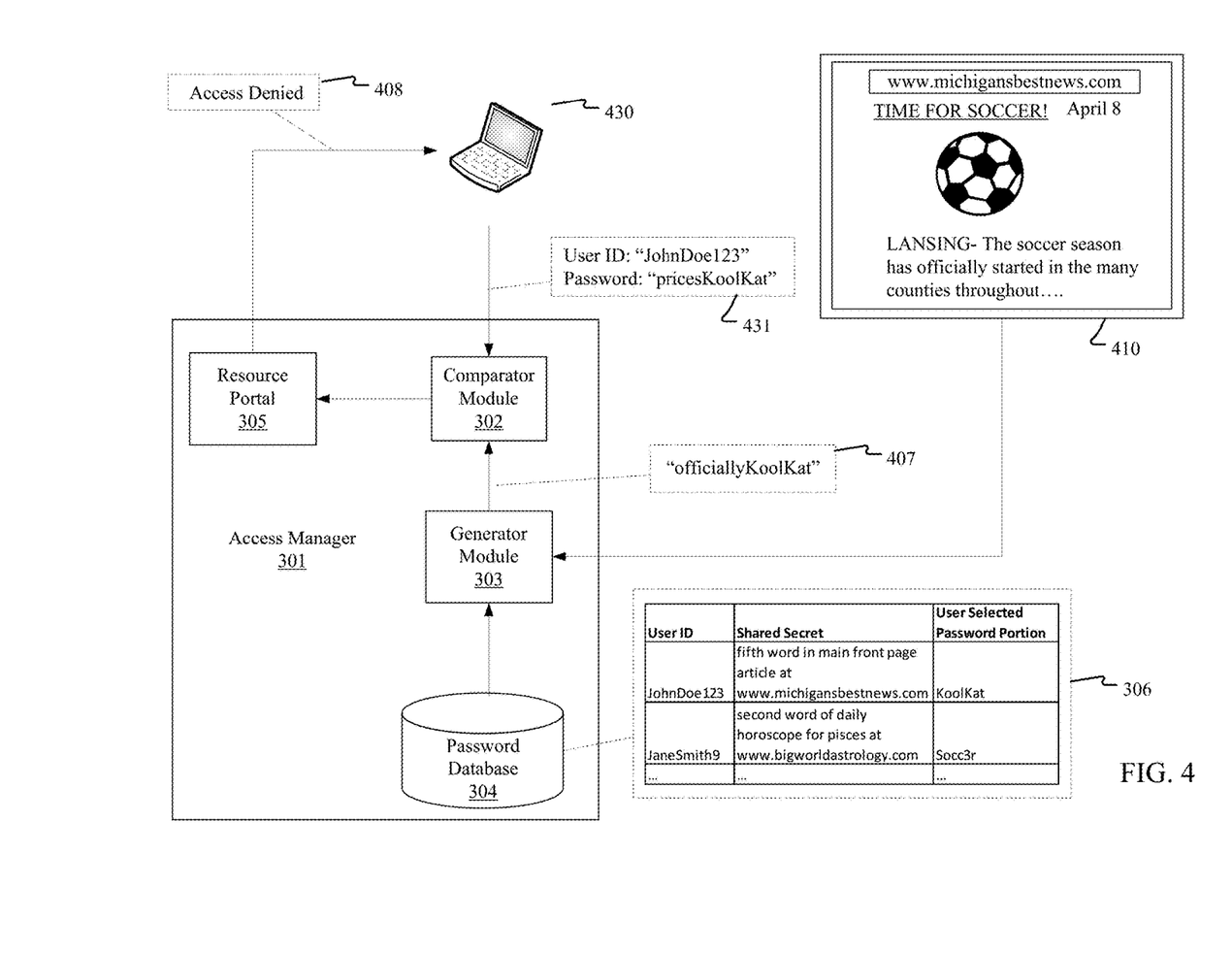
FIG. 4 illustrates a block diagram depicting an interloper communicating with the access manager of FIG. 3 in an attempt to gain access to the resource, in accordance with embodiments of the present disclosure.

Referring now to FIG. 4, shown is a block diagram depicting an interloper 430 communicating with the access manager 301 of FIG. 3 in an attempt to gain access to the resource, in accordance with embodiments of the present disclosure. In this depicted example, the interloper 430 attempts to gain access to the resource on April 8 by using the credentials of the authorized user 320 that the authorized user had entered the previous day (April 7). The interloper 430 could have obtained the credentials, for example, by intercepting the transmission of those credentials by the authorized user on the previous day (as shown in box 321 of FIG. 3). The interloper 430 transmits the user ID of "JohnDoe123" and password of "pricesKoolKat", per box 431, to the access manager 301. In response to receiving the credentials, the generator module 303 obtains the shared secret and user selected password portion associated with the user ID "JohnDoe123" from the database table 306 of password database 304. Using the shared secret, the generator module 303 obtains the fifth word ("officially") from the current (i.e., April 8th rather than April 7th) article on the webpage 410. The generator module then generates the duplicate password of "officiallyKoolKat", per box 407, and transmits the duplicate password to the comparator module 302. The comparator module 302 determines that "officiallyKoolKat" does not match "pricesKoolKat" and notifies the resource portal 305 accordingly. The resource portal 305, per block 408, denies the interloper 430 access to the resource.

Figure 5:
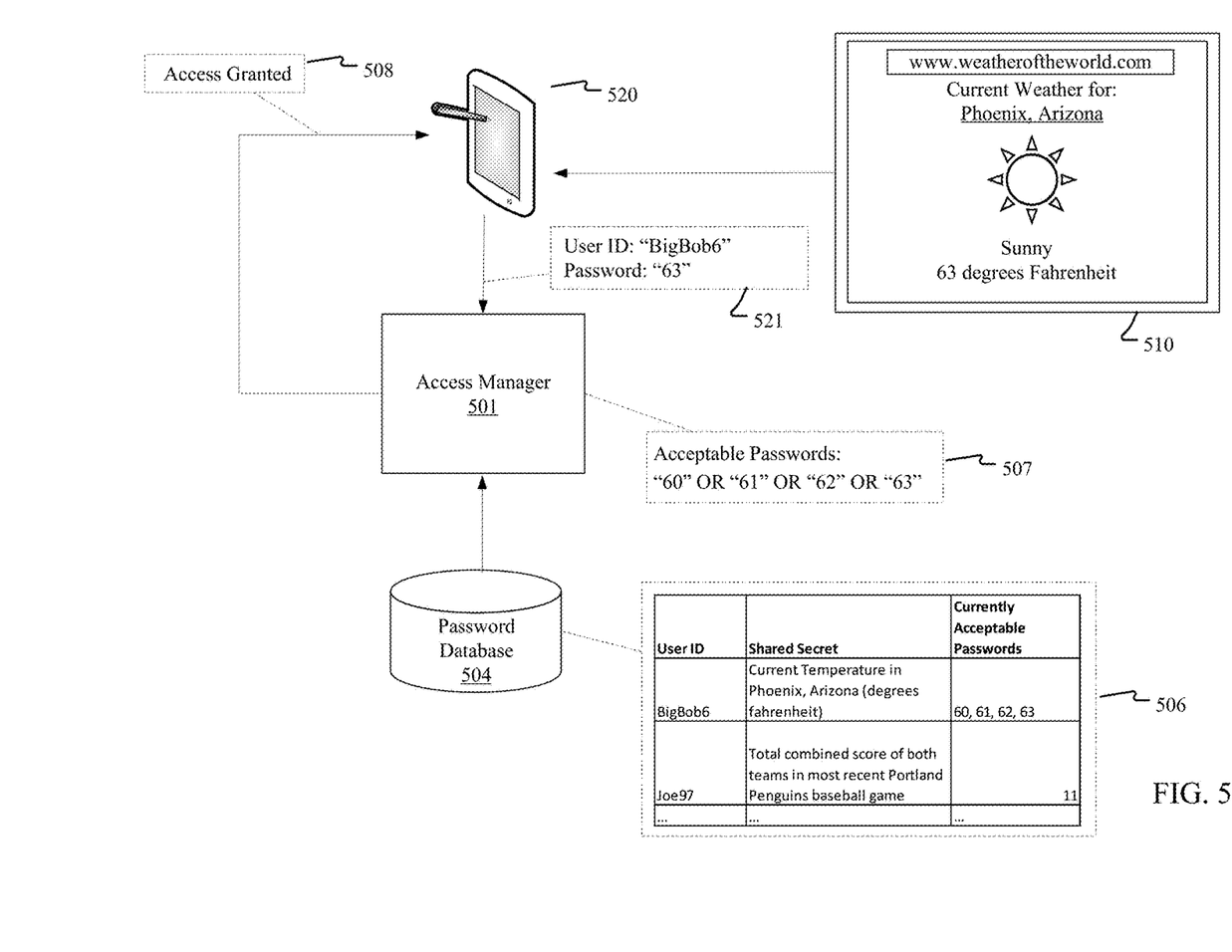
FIG. 5 illustrates a block diagram depicting another authorized user attempting to gain access to a resource through another access manager, in accordance with embodiments of the present disclosure.

Referring now to FIG. 5, shown is a block diagram depicting an authorized user 520 attempting to gain access to a resource through access manager 501, in accordance with embodiments of the present disclosure. The figure includes an access manager 501 and a password database 504 that may, in some embodiments, be the same or substantially similar to the access manager 301 and password database 304 of FIG. 3, respectively. In the depicted example, from a party requesting access to the resource, the access manager requires the entry of a user ID and a numerical value that is a most recent value of a shared secret. Further, the access manager 501 may make certain allowances for passwords that would otherwise be deemed stale or otherwise unusable. For example, the access manager 501 may allow a password that is based on a value of the shared secret that was accurate any time in the past four hours. As depicted, the data table portion 506 included in password database 504 includes user IDs, shared secrets, and currently acceptable passwords that are linked (e.g., because they share the same row in the table). For example, in the first row of table portion 506, a user ID of "BigBob6" is linked with a shared secret of the "current temperature in Phoenix, Ariz." Because the temperature in Phoenix varied over the range of 60 to 63 degrees Fahrenheit in the previous four hours, all four of the values of "60", "61", "62", and "63" are listed as currently acceptable passwords in the last cell of the first row. As another example, in the second row of the table portion 506, a user ID of "Joe97" is linked with a shared secret of the "total combined score of both teams in most recent Portland Penguins baseball game." In this example, because the current value of the shared secret has not changed in the past four hours, the only currently acceptable password is "11". In some embodiments, other types of password variation may also be allowable. For example, in some embodiments, an access manager may accept a range of values that are relatively close to the actual value as being correct for password purposes or the access manager may accept the last N number of actual values at any given time as correct for password purposes (e.g., wherein N is a predetermined number of recent recurrences of the recurring public event).

In some embodiments, in order to maintain a list of currently acceptable passwords associated with each user ID, the data table portion 506 may be updated in a variety of different manners. For example, the list of currently acceptable passwords may continuously be updated based on information from one or more publicly available news sources.

To continue the example, the authorized user 520 attempts to use his tablet computer to gain access to a resource through access manager 501. The authorized user 520 remembers his user ID and designated shared secret. He uses his tablet to search the Internet for the current temperature in Phoenix, Ariz. More specifically, he discovers the current temperature using the weather webpage 510. Per box 521, the authorized user 520 transmits his user ID of "BigBob6" and the current password of "63" to the access manager 501. Based on the user ID, the access manager is able to locate the currently acceptable passwords of "60, 61, 62, and 63" in the table portion 506 of password database 504. The access manager 501 then compares the acceptable passwords, per block 507, with the password entered by the authorized user 520. Upon determining that there is a match for the value of "63", the access manager 501 grants the authorized user 520 access to the resource, per block 508.

In some embodiments, the specific recurring public event that serves as the basis for a password may, for each instance access is requested, be determined based on a physical location of the access requester at the time access is requested. This may mean that, in some embodiments, the shared secret between a user and an access manager may include only the type of the recurring public event that will serve as the password basis. In such embodiments, the specific recurring public event of that type which serves as the password basis may be determinable only at the time of a given request for access.

For example, in one scenario, an access manager and a user designate (e.g., agree on or accept) that the shared secret upon which the user's password will be based is "the current temperature where the user is located at the time access is requested". Continuing with the example, if the user is in Seattle, Wash. on a day that it is 50 degrees Fahrenheit there, his correct password would be "50". However, if the user was instead in Miami, Fla. where the temperature was 70 degrees Fahrenheit on that same day, then his correct password would be "70". In this scenario, the access manager may need to determine the user's location (e.g., using the user's IP address) in order to determine the correct password for that user. Such location-based passwords may create added layers of protection. For example, in this scenario, if an interloper in Minneapolis, Minn. (where it is 15 degrees Fahrenheit) intercepts the user's password, he may not be able to gain access to the resource because the password at his location would be different ("15" in this example).

In some embodiments, other variants on location-based passwords are also possible. For example, the shared secret could be "the current temperature at the nearest metropolitan area (to where the user is located at the time access is requested) with over 300,000 people." In this example, the correct password for a user attempting to access the resource from fifty miles outside of Albuquerque, N. Mex. could be the current temperature in Albuquerque at the time of the request.

Figure 6:
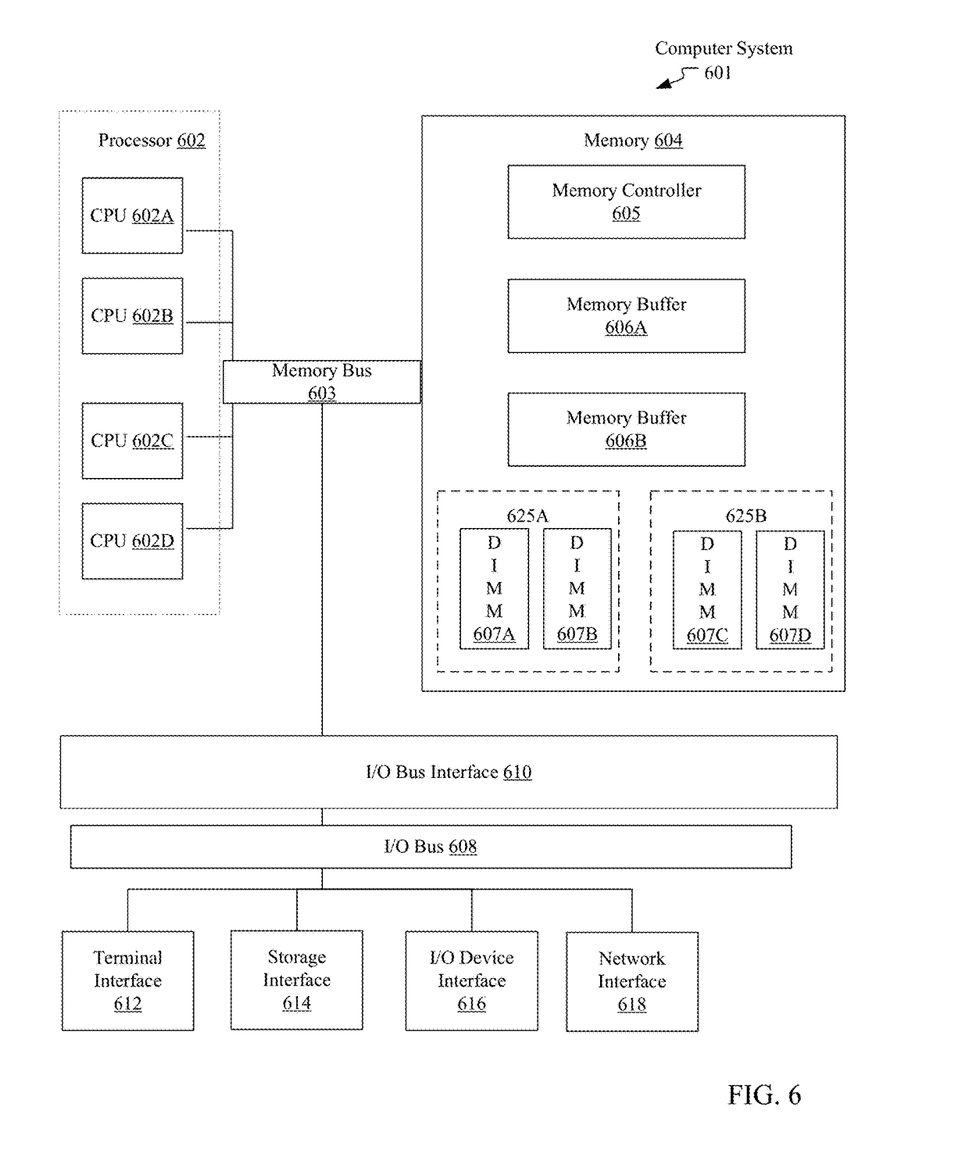
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system (i.e., computer) 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may comprise one or more levels of on-board cache.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 601, and may also include the virtual memory of other computer systems coupled to the computer system 601 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

In some embodiments, the main memory or memory subsystem 604 may contain elements for control and flow of memory used by the CPU 602. This may include all or a portion of the following: a memory controller 605, one or more memory buffers 606A and 606B and one or more memory devices 625A and 625B. In some embodiments, the memory devices 625A and 625B may be dual in-line memory modules (DIMMs), which are a series of dynamic random-access memory (DRAM) chips 607A-607D (collectively referred to as 607) mounted on a printed circuit board and designed for use in personal computers, workstations, and servers. The use of DRAMs 607 in the illustration is exemplary only and the memory array used may vary in type as previously mentioned.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail below, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing access to a resource by an access manager, the method comprising:
    designating, at a first time and from a first user location, a variable attribute of a recurring public event as a shared secret between the access manager and a user, wherein the recurring public event is not associated with the resource, and wherein values of the variable attribute of the recurring public event vary based on both time and location;
    receiving, at a second time occurring after the first time and from a second user location different from the first user location, a shared key from the user, the shared key based on a value of the variable attribute of the recurring public event at a most recent recurrence of the recurring public event relative to the second time at a nearest location of the recurring public event relative to the second user location;
    evaluating the shared key; and
    granting, in response to the evaluating, the user access to the resource.

2. The method of claim 1, wherein the most recent recurrence of the recurring public event relative to the second time at the nearest location of the recurring public event relative to the second user location occurred after the first time and before the second time.

3. The method of claim 1, wherein the recurring public event is independent of influence by the user and the access manager.

4. The method of claim 1, wherein a particular value of the variable attribute of the recurring public event at a particular recurrence of the recurring public event at a particular location of the recurring public event is, prior to the particular recurrence, unknowable by the access manager and the user.

5. The method of claim 1, wherein the evaluating the shared key comprises:
    obtaining, from a third party information source, the value of the variable attribute of the recurring public event at the most recent recurrence of the recurring public event at the nearest location of the recurring public event relative to the second user location;
    generating, based on the value of the variable attribute of the recurring public event at the most recent recurrence of the recurring public event at the nearest location of the recurring public event relative to the second user location, a duplicate of the shared key; and
    comparing the shared key to the duplicate of the shared key.

6. The method of claim 1 further comprising:
    receiving, at a third time occurring after the second time and from a third user location different from the first user location and the second user location, a second shared key from the user, the second shared key based on a value of the variable attribute of the recurring public event at a most recent recurrence of the recurring public event relative to the third time at a nearest location of the recurring public event relative to the third user location, wherein the most recent recurrence of the recurring public event relative to the third time at the nearest location of the recurring public event relative to the third user location occurred after the most recent recurrence of the recurring public event relative to the second time at the nearest location of the recurring public event relative to the second user location, and wherein the second shared key is different from the first shared key;
    evaluating the second shared key; and
    granting, in response to the evaluating, the user re-access to the resource.

7. The method of claim 1 further comprising:
    re-receiving, at the second time and from a third user location different from the first user location and the second user location, the shared key, wherein a most recent recurrence of the recurring public event relative to the second time at a nearest location of the recurring public event relative to the third user location occurred at a different location from the most recent recurrence of the recurring public event relative to the second time at the nearest location of the recurring public event relative to the second user location;
    reevaluating the shared key; and
    denying, in response to the reevaluating, re-access to the resource.

8. A computer program product for managing access to a resource by an access manager, the computer program product comprising a computer readable storage medium having program instructions embodied therewith, the program instructions executable by a computer to cause the computer to perform a method comprising:

designating, at a first time and from a first user location, a variable attribute of a recurring public event as a shared secret between the access manager and a user, wherein the recurring public event is not associated with the resource, and wherein values of the variable attribute of the recurring public event vary based on both time and location;

receiving, at a second time occurring after the first time and from a second user location different from the first user location, a shared key from the user, the shared key based on a value of the variable attribute of the recurring public event at a most recent recurrence of the recurring public event relative to the second time at a nearest location of the recurring public event relative to the second user location;

evaluating the shared key; and granting, in response to the evaluating, the user access to the resource.

9. The computer program product of claim 8, wherein the most recent recurrence of the recurring public event relative to the second time at the nearest location of the recurring public event relative to the second user location occurred after the first time and before the second time.

10. The computer program product of claim 8, wherein a particular value of the variable attribute of the recurring public event at a particular recurrence of the recurring public event at a particular location of the recurring public event is, prior to the particular recurrence, unknowable by the access manager and the user.

11. A system for managing access to a resource by an access manager, the system comprising:

a memory; and at least one processor circuit in communication with the memory, wherein the at least one processor circuit is configured to perform a method comprising:

designating, at a first time and from a first user location, a variable attribute of a recurring public event as a shared secret between the access manager and a user, wherein the recurring public event is not associated with the resource, and wherein values of the variable attribute of the recurring public event vary based on both time and location;

receiving, at a second time occurring after the first time and from a second user location different from the first user location, a shared key from the user, the shared key based on a value of the variable attribute of the recurring public event at a most recent recurrence of the recurring public event relative to the second time at a nearest location of the recurring public event relative to the second user location;

evaluating the shared key; and granting, in response to the evaluating, the user access to the resource.

12. The system of claim 11, wherein the most recent recurrence of the recurring public event relative to the second time at the nearest location of the recurring public event relative to the second user location occurred after the first time and before the second time.

13. The system of claim 11, wherein a particular value of the variable attribute of the recurring public event at a particular recurrence of the recurring public event at a particular location of the recurring public event is, prior to the particular recurrence, unknowable by the access manager and the user.

* * * * *